March 25, 1969    L. H. CAVENY    3,434,287
THRUST VECTOR CONTROL FOR SOLID PROPELLANT ROCKET
MOTORS BY MEANS OF INJECTION
Filed Feb. 23, 1967
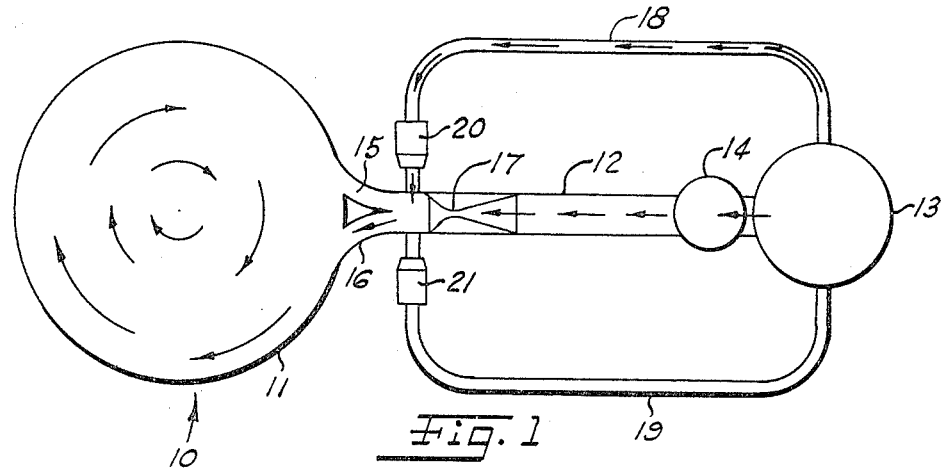
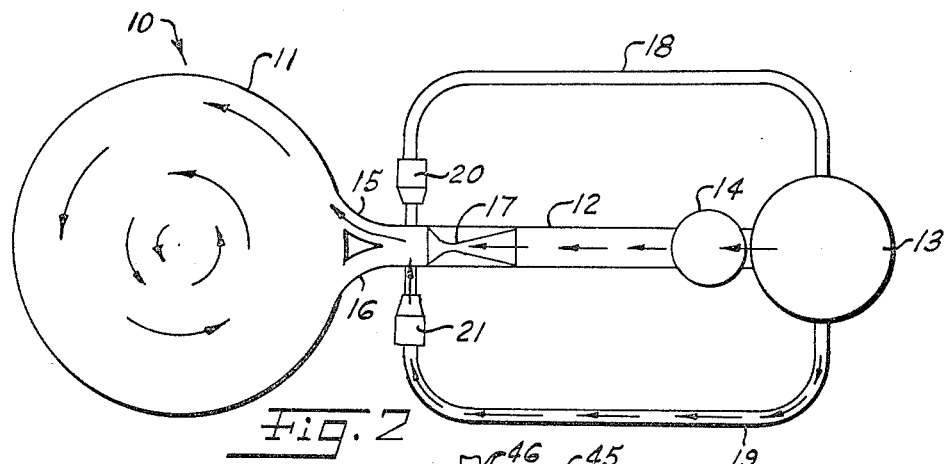
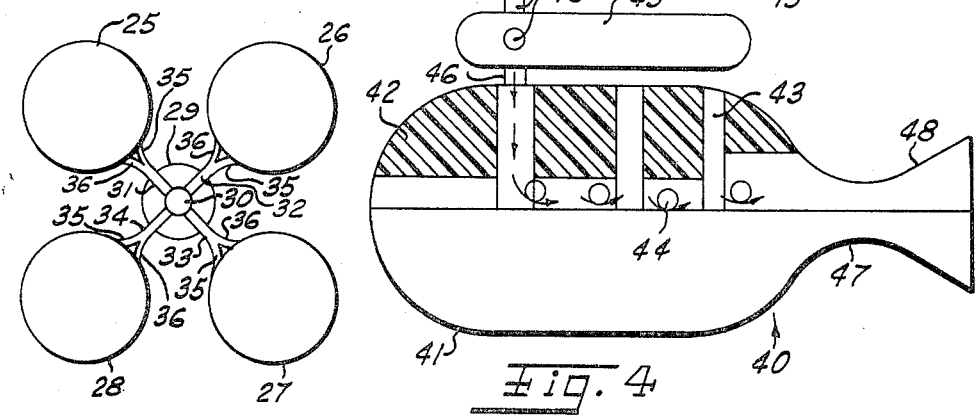
Leonard H. Caveny INVENTOR.
BY *R. S. Williams*
ATTORNEY

United States Patent Office 3,434,287
Patented Mar. 25, 1969

3,434,287
THRUST VECTOR CONTROL FOR SOLID PROPELLANT ROCKET MOTORS BY MEANS OF INJECTION
Leonard H. Caveny, Huntsville, Ala., assignor to Thiokol Chemical Corporation, Bristol, Pa., a corporation of Delaware
Filed Feb. 23, 1967, Ser. No. 617,968
Int. Cl. F02k 7/08, 9/06, 9/04
U.S. Cl. 60—224
6 Claims

ABSTRACT OF THE DISCLOSURE

A trust vector control system for one or a cluster of booster type solid propellant rocket motors that includes a vortex injection into the solid propellant rocket motors in either a clockwise or counter-clockwise direction.

Background of the invention

*Field of the invention.*—A requirement was established for the control of the thrust in booster solid propellant rocket motors either in a single motor or in a cluster of motors. In booster solid propellant rocket motors there is a difficulty in manufacturing the solid propellant in the rocket motor case so that the performance of the motor is absolutely predictable. Also it is necessary to correct the thrust level in flight in order to fly the desired trajectory. One of the conventional methods in use at the present time is to produce what is termed segmented motors, i.e., the solid propellant is positioned in a segmented rocket motor case or the solid propellant can be manufactured in segments and then positioned in a unitary rocket motor case. The segmented rocket motor case is then assembled to form a unitary solid propellant rocket motor. It was determined that if the segments of solid propellant or segmented motor case were spaced from each other when positioned in the final assembly, annular radially disposed channels, passageways or cavities would be formed in the solid propellant. It was obvious, therefore, that if a vortex injection could be introduced into the rocket motor case, either with a liquid or gaseous injectant, such injectant would enter into the areas between the spaced segments of the solid propellant and thus enhance the burning rate of the solid propellant and produce a decrease in the effective throat area with a substantial increase in thrust and power of the solid propellant rocket motor. Thus the resulting solid propellant rocket motor is controllable.

*Description of the prior art.*—Injection of oxidants and other materials into rocket motors have been proposed, but such injectants were used to cause combustion of the solid propellants that were inadequate in either their ability to combust or to cause ignition or reignition of the solid propellant, however, none of the procedures followed have utilized an injection system to increase the burning rate of a solid propellant and to decrease the effective throat area by vortex injection after the initial ignition and combustion of the solid propellant to control the thrust vector of the solid propellant rocket motor.

Summary of the invention

This invention, therefore, relates to improvements in effectively increasing the thrust vector control requirement of solid propellant rocket motors by the use of vortex injections, whereby a liquid or gaseous injectant is introduced into the solid propellant rocket motor to increase the burning rate of the solid propellant and to decrease the effective throat area and thus provide a thrust vector control for the solid propellant rocket motor.

The thrust vector control requirements for a propulsion system composed of a cluster of solid propellant rocket motors are dependent upon the trajectory of the vehicle which contains the cluster of motors, the variations from each other that occur in the solid propellant rocket motors that are assembled to create the cluster and variations from the desired performance caused by manufacturing and raw material variations. To overcome the variations that exist in the individual rocket motors, it was determined that a thrust vector control of the cluster of solid propellant rocket motors could be achieved by introducing into each solid propellant rocket motor a vortex that would be injected into each solid propellant rocket motor upstream of the nozzle throat of the rocket motor case.

The beneficial effects that would be obtained by the use of such a vortex injection would include:

(1) An increase in the burning rate of the solid propellant by the scrubbing effect of the surface of the solid propellant that would occur when the vortex injection was introduced into the solid propellant rocket motor.

(2) The vortex as it passes through the throat of the nozzle would decrease the effective throat area of the nozzle. Thus, this decrease in the effective throat area would increase the chamber pressure of the combustion chamber in the rocket motor case and thus effectively increase the thrust of the solid propellant rocket motor.

(3) The injectant introduced by the vortex injection would also increase the mass discharge of the solid propellant rocket motor and thus effectively increase the thrust of the solid propellant rocket motor.

It is an object of the invention, therefore, to provide a vortex injection for each motor of a cluster of solid propellant rocket motors to achieve, thrust magnitude control, thrust vector control and a positive reduction in variations that exist between the individual solid propellant rocket motors that are assembled to create the cluster of solid propellant rocket motors.

Brief description of the drawing

This invention is, therefore, directed to a particular application of a positively proven concept of thrust modulation and it is believed that further objects and advantages of the invention will be apparent from the following description thereof when considered in connection with the accompanying drawing in which:

FIGURE 1 is a schematic view of the application of an embodiment of the invention to a solid propellant rocket motor wherein the vortex injection is accomplished in a clockwise direction;

FIGURE 2 is a view similar to FIGURE 1 wherein the vortex injection is accomplished in a counter-clockwise direction;

FIGURE 3 is a schematic view, with certain parts removed, showing the manner in which a plurality of solid propellant rocket motors are arranged to create a cluster of solid propellant rocket motors; and FIGURE 4 is a schematic view, with certain parts removed, illustrating the manner in which the vortex injection system embodying the invention is utilized with a segmented solid propellant rocket motor.

Description of the preferred embodiment

Referring more in detail to the drawing and more particularly to FIGURES 1 and 2 thereof, wherein like reference numerals are utilized to designate like parts, the reference numeral 10 is utilized to generally designate a solid propellant rocket motor.

The solid propellant rocket motor 10, as is conventional, comprises a motor case 11 that is provided at the aft end with a nozzle which communicates with a combustion chamber that is formed within the motor case 11 of the solid propellant rocket motor 10. The variance in size of the solid propellant rocket motor 10 will depend on the propulsion system that is required to be utilized to obtain the particular operational requirements that are necessary, to meet a certain mission that it is necessary to achieve.

Integral with and extending laterally of the motor case 11, at a right angle thereto, is a tubular extension 12 which at its outer end terminates in communication with a tank 13. The tank 13 will contain a liquid or gaseous injectant and interposed in the extension 12 is a throttling valve 14 which will control the flow of the injectant through the extension 12 as indicated by the arrows therein. At the end of the extension 12 that is integral with the motor case 11, the extension 12 is divided into an inlet passageway 15 and an inlet passageway 16. Mounted in the extension 12 adjacent the inlet passageways 15 and 16 is a venturi 17 which will regulate the flow and pressure of the injectant as it flows from the tank 13 toward the passageways 15 and 16.

A conduit 18 extends from communication with the tank 13 to communication with the extension 12 just forwardly of the venturi 17 and a similar conduit 19 extends from a communication with the tank 13 to communication with the extension 12 just forwardly of the venturi 17 in diametrically opposed relation to the communication of the conduit 18 with the extension 12.

A solenoid controlled jet valve 20 is interposed in the conduit 18 and a solenoid controlled jet valve 21 is interposed in the conduit 19 and these valves control the flow of the injectant in the conduits 18 and 19 as indicated by the arrows therein.

In the operation of the injection system, it is understood that valves 14, 20 and 21 are command controllable valves and any conventional electrical arrangement to control these valves from the ground or the vehicle can be utilized.

The components 12, 15, 16, 17, 18, 19, 20 and 21 combine to form a fluid control device referred by one skilled in the art as a bi-stable valve.

As the rocket motor is in flight, the valve 14 is actuated to permit the flow of the injectant from the tank 13 into the solid propellant rocket motor 10. As the injectant enters the motor case 11, a swirl, vortex or whirlpool is created by the injectant within the motor case 11 and this action will advance fore and aft of the communication of the extension 12 with the motor case 11. It is necessary to counteract any roll that occurs in the vehicle propelled by the rocket motor 10, therefore, if the roll is counter-clockwise, the valve 20 is opened to cause the injectant to swirl in a clockwise direction, as shown by the arrows in FIGURE 1, if the direction of roll is reversed to clockwise movement, then the valve 21 is opened to cause the injectant to swirl in a counter-clockwise direction, as shown by the arrows in FIGURE 2. The flow of the injectant into the motor case 11 can be cancelled at any time by either closing the valve 14, or closing of the valves 20 and 21. Thus, the valves 20 and 21 can control the direction of the vortex injection and the magnitude of the vortex can be controlled by the valve 14 to regulate the flow rate of the injectant through the extension 12 from the tank 13. It is to be understood that the injectant will be selected as to the ability of is constituents to react thermochemically with the main propellant gases in order to increase the thrust modulation effects.

In FIGURE 3 the solid propellant rocket motors 25, 26, 27 and 28 are arranged to form a cluster, it being understood that the solid propellant rocket motors 25, 26, 27 and 28 can be strapped or otherwise rigidly secured together in any conventional manner. The injectant tank 29, valve 30 and extensions 31, 32, 33 and 34 are all arranged, as previously described for FIGURES 1 and 2 and each of the extensions are provided with inlet passageways 35 and 36, as previously described for inlets 15 and 16 and conduits, not shown, are arranged for the cluster of rocket motors in similar fashion as are the conduits 18 and 19 arranged for FIGURES 1 and 2. It is to be understood, therefore, that each of the solid propellant rocket motors 31, 32, 33 and 34 can be controlled individually or they can be controlled so that the oppositely disposed solid propellant rocket motors may be controlled or the entire cluster controlled as is necessary to achieve thrust modulation.

In FIGURE 4 a segmented solid propellant rocket motor 40 is illustrated, this solid propellant rocket motor is of the booster type that is in excess of 40 inches in diameter and the type of solid propellant rocket motor that may be easily assembled if the solid propellant is positioned in the motor case 41 in segments 42, such as shown in FIGURE 4. The segments do not necessarily have to be of the same size and shape, but are shaped to agree with the thrust impulse and ballistic qualities of the solid propellant rocket motor that is assembled to meet certain operational requirements.

As the segments 42 are positioned in the motor case 41, radially, axially spaced slots 43, in relation to the longitudinal axis of the motor case 41, can be provided by spacing the segments 42 to provide such slots, or tubular slots 44 may be formed in the segments before installation of the segments in the motor case 41. The tubular slots 44 are also horizontally and radially disposed in the motor case 41, but they can extend in any angular relation to the longitudinal axis of the motor case 41 that may be required.

When the solid propellant rocket motor 40 is used in a cluster, an injectant tank 45 is utilized, as in FIGURE 3 and extensions 46 are utilized with this motor as are the extensions 31, 32, 33 and 34 in FIGURE 3.

All of the solid propellant rocket motors operate as described for FIGURES 1 and 2 and it will be noted that the vortex injection is upstream from the throat 47 of the nozzle 48, as shown in FIGURE 4.

This invention is directed toward a proven concept of thrust modulation and it is believed that the invention, from the foregoing description, will be clear to one skilled in the art, it also being understood that variations in the construction and mode of operation of the invention may be adhered to provided such variations fall within the spirit of the invention and the scope of the appended claims.

Having thus described the invention what is claimed as new and desired to be secured by Letters Patent is:

1. A vortex injection system for modulating the thrust of a solid propellant rocket motor including a motor case, a combustion chamber, a nozzle communicating with the combustion chamber and a plurality of solid propellant segments positioned in said combustion chamber and axially spaced from each other to provide at least one annular channel therebetween for receiving an injectant, comprising a tubular extension extending laterally of the motor case and in communication with the channel at said motor case, a tank containing an injectant at the outer end of said tubular extension and in communication therewith, a throttling valve positioned in said tubular extension downstream of said tank, a venturi in said tubular extension downstream of said throttling valve, conduits extending from said tank and in communication therewith and extending forwardly of said tank to communicate with said tubular extension in diametrically opposed relation to each other and a jet control valve in each conduit for controlling the flow of injectant from said tank to said tubular extension and the direction at which the injectant enters said channel for creating an injectant vortex therein.

2. A vortex injection system as in claim 1, wherein said tubular extension at its point of communication with said combustion chamber is provided with a plurality of inlet passages.

3. A vortex injection system as in cliam 1, wherein one of said jet controlled valves is opened to provide counterclockwise direction of the injectant in said combustion chamber and the other of said jet controlled valves is opened to provide clockwise direction of the injectant in said combustion chamber.

4. A vortex injection system as in claim 1, wherein the solid propellant rocket motor is one of a cluster of solid propellant rocket motors and a tubular extension is in communication with each of said rocket motors and with said injectant tank.

5. A vortex injection system as in claim 4, wherein each of said solid propellant rocket motors is of the booster type extending 40 inches in diameter.

6. A vortex injection system as in claim 1 wherein said solid propellant segments are arranged to provide a plurality of channels.

References Cited

UNITED STATES PATENTS

| | | | |
|---|---|---|---|
| 3,136,119 | 6/1964 | Avery | 60—251 XR |
| 3,142,152 | 7/1964 | Sessums | 60—251 |
| 3,177,657 | 4/1965 | Strauss et al. | 60—251 |
| 3,289,412 | 12/1966 | Iwanciow | 60—251 |
| 3,345,822 | 10/1967 | Povinelli | 60—251 |

CARLTON R. CROYLE, *Primary Examiner.*

U.S. Cl. X.R.

60—228, 251, 254